United States Patent [19]
Negrete

[11] Patent Number: 5,335,779
[45] Date of Patent: Aug. 9, 1994

[54] VIBRATORY FEEDER

[75] Inventor: Steven E. Negrete, Woodstock, Conn.

[73] Assignee: Spirol International Corporation, Danielson, Conn.

[21] Appl. No.: 86,927

[22] Filed: Jul. 2, 1993

[51] Int. Cl.$^5$ ............................................. B65G 27/02
[52] U.S. Cl. ............................................ 198/756; 198/757
[58] Field of Search ................. 198/752, 756, 757, 750

[56] References Cited

U.S. PATENT DOCUMENTS

| | | |
|---|---|---|
| 2,658,609 | 11/1953 | Weyandt . |
| 2,760,504 | 8/1956 | Spurlin .................. 198/756 X |
| 2,818,968 | 1/1958 | Carrier, Jr. . |
| 2,827,062 | 3/1958 | Nitsche . |
| 2,847,767 | 8/1958 | Carrier, Jr. .................. 198/756 X |
| 2,853,180 | 9/1958 | White ........................... 198/756 |
| 3,112,022 | 11/1963 | Horton et al. . |
| 3,173,768 | 3/1965 | Witte . |
| 3,292,775 | 12/1966 | White ........................... 198/756 X |
| 3,317,041 | 5/1967 | Century . |
| 3,407,542 | 10/1968 | McKibben ..................... 198/752 X |
| 3,687,264 | 8/1972 | Jackson . |
| 4,150,751 | 4/1979 | Romangnoli . |

FOREIGN PATENT DOCUMENTS 0009608  1/1982  Japan ............................. 198/757

Primary Examiner—James R. Bidwell
Attorney, Agent, or Firm—Chilton, Alix & Van Kirk

[57] ABSTRACT

A vibratory bowl feeder with a track extending generally helically upwardly on the inside of the bowl and then generally helically downwardly on the outside of the bowl and a return pan on the exterior of the bowl for returning parts to the bottom of the bowl, the track, return pan and bottom having smooth part support surfaces with perforations uniformly arranged over their entire surface areas, the perforations having a size substantially less than the size of the parts and covering at least approximately 40% of the total area to reduce the area of contact between the parts and support surface so that the parts are propelled upwardly from the support surface with greater effect during the advancement phase of vibratory movement to enable the support surface to be retracted below the parts during the retraction phase of vibratory movement. The bottom, in lieu of bottom perforations, has a raised spiral rib with evenly spaced convolutions.

17 Claims, 3 Drawing Sheets

VIBRATORY FEEDER

BACKGROUND AND SUMMARY OF THE INVENTION

The present invention relates generally to vibratory feeders of the type having an elongated track and operable to convey parts along the track by oscillation or vibration of the track. The present invention has particular application to bowl type vibratory feeders having a bowl with a vertical axis and a track which extends generally helically upwardly on the inside of the bowl and then generally helically downwardly on the outside of the bowl for feeding parts in a predetermined manner to an associated device. The present invention relates more particularly to a new and improved track surface for conveying parts along the track with greater reliability and effectiveness.

It has been found that in a bowl feeder, certain types of parts, typically rubber and other elastomeric parts, are conveyed along the track of the bowl feeder at a low and inadequate rate and well below the designed or optimum rate. The low conveyance rate is attributed to the absorption, by the elastomeric part, of some of the energy of the track vibration and the relatively high effective coefficient of friction between the part and track surface. Inadequate part conveyance is also encountered when a part is coated with a light film of oil or other substance which causes the part to stick or adhere, even lightly, to the track support surface. With both types of problem parts, the low and inadequate conveyance rate is attributed to the failure of the track to propel each part upwardly from the track sufficiently during the forward movement of the track to enable the track to be retracted below the part during the rearward movement of the track.

A principal aim of the present invention is to provide a new and improved vibratory feeder which provides a generally smooth and consistent rate of conveyance of such problem parts at approximately the intended or optimum rate.

Another aim of the present invention is to provide a new and improved track surface for a vibratory feeder which propels each part upwardly from the track with greater effect during the forward movement of the track to enable the track surface to be retracted below the part during the rearward movement of the track.

Another aim of the present invention is to provide in a bowl feeder, a new and improved supply track section on the inside of the bowl for conveying parts generally helically upwardly from the bottom of the bowl at approximately the intended or optimum rate.

A further aim of the present invention is to provide in a vibratory feeder, a new and improved method for conveying rubber and other elastomeric parts and parts which have a tendency to adhere, even lightly, to the track surface, at approximately the intended rate, along a smooth part support surface of the vibratory feeder track.

Another aim of the present invention is to provide a new and improved bowl feeder of the type described having a bottom configured to convey problem parts at an appropriate rate along the bottom of the bowl to the track on the inside of the bowl and a return pan on the outside of the bowl configured to convey problem parts at an appropriate rate back to the bottom of the bowl.

Other objects will be in part obvious and in part pointed out more in detail hereinafter.

A better understanding of the invention will be obtained from the following detailed description and the accompanying drawings of an illustrative application of the invention.

DESCRIPTION OF PREFERRED EMBODIMENT

Figure 1:
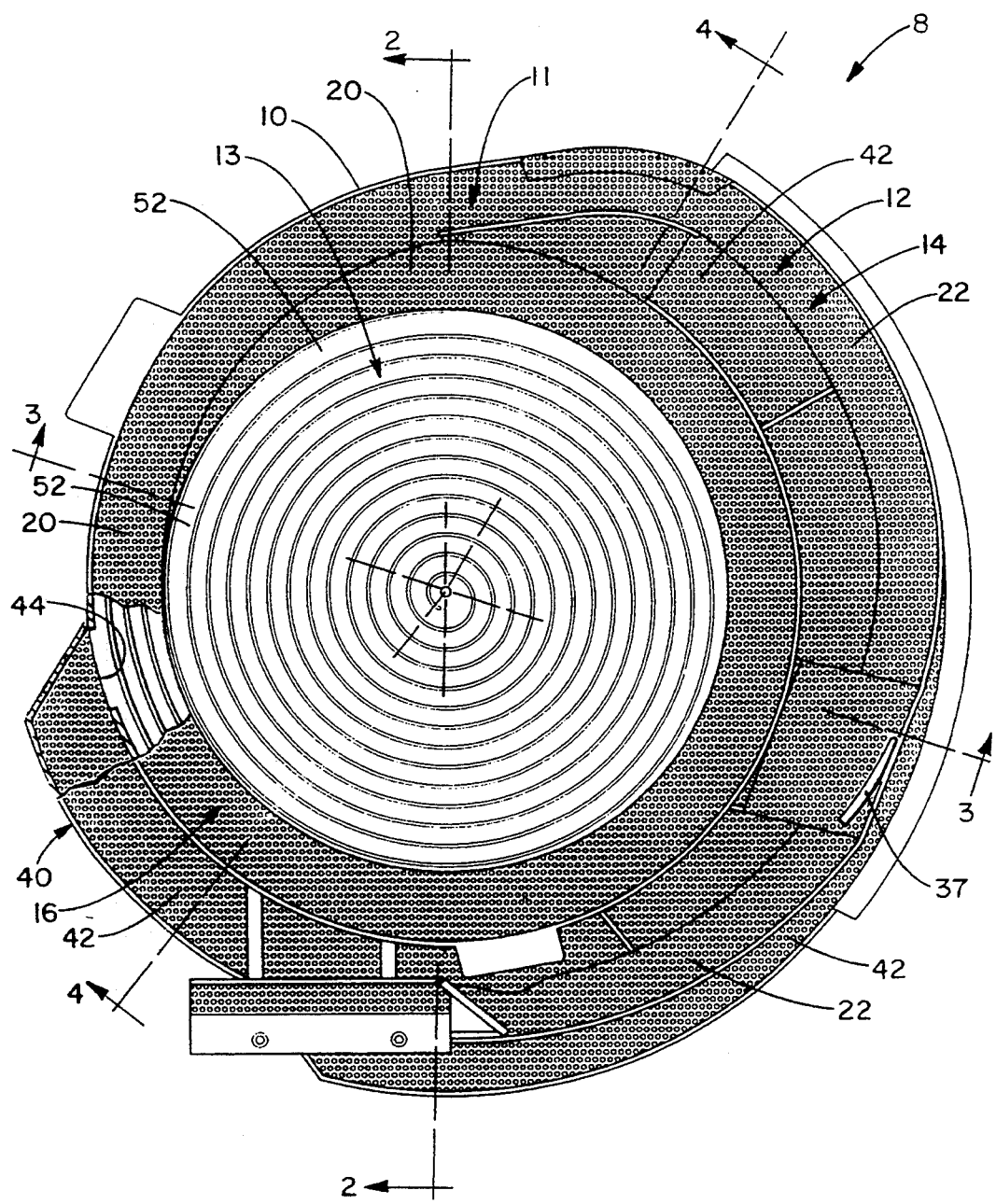
FIG. 1 is a top plan view, partly broken away and with parts removed, of a bowl feeder incorporating an embodiment of the present invention.

Bowl feeders of the type disclosed are useful with a large variety of parts having different sizes and shapes and made of different materials. In most cases, the bowl feeder is sized for the parts with which the bowl feeder is used and the track of the bowl feeder is specially configured to align, position or otherwise orient the parts and then feed the oriented parts in a predetermined manner to associated equipment.

In the drawings, like numerals are employed to designate the same or similar parts. A bowl feeder 8 incorporating a preferred embodiment of the present invention is shown in FIGS. 1-4. The bowl feeder 8 has a central upright bowl 10 with a vertical axis and a continuous track 12 fixed to the bowl 10. The track 12 extends generally helically upwardly on the inside of the bowl 10 from the bottom 13 of the bowl 10 and then generally helically downwardly on the outside of the bowl 10. The bowl feeder 8 is designed to hold a supply of parts on the bottom 13 of the bowl 10. The track 12 is configured to convey the parts upwardly from the bottom 13, then align, position or otherwise orient the parts and then feed the oriented parts in a predetermined manner to associated equipment for assembly, packaging, etc.

The track 12 has a transition section 11 at the top of the bowl 10 and a succeeding orient and feed section on the outside of the bowl 10 to orient the parts and feed the oriented parts in a predetermined manner to the associated equipment. The transition section 11 and succeeding orient and feed section on the outside of the bowl 10 are collectively designated by the numeral 14 and collectively referred to hereinafter as "tooling section" or just "tooling". An internal or supply track section 16 is provided on the inside of the bowl 10 to convey the parts upwardly from the bottom 13 of the bowl 10 to the tooling 14. The inside track 16 extends generally helically upwardly from the bottom 13 of the bowl 10 and has a smooth part support surface 20 along its full length. The helix angle or slope of the inside track surface 20 is preferably maintained constant along its full length but may vary slightly to vary the upward rate of conveyance along the inside track 16.

The upper transition portion 11 of the tooling 14 has a variable angle or slope for conveying the parts from the top of the inside track 16 to the exterior of the bowl 10. The remainder of the tooling 14 runs generally helically downwardly around the exterior of the bowl 10. The tooling 14 also has a smooth part support surface 22. In contrast to the inside track surface 20, the angle or slope of the tooling surface 22 may vary significantly along its length. Also, the tooling surface 22 may not continue uninterrupted to the lower discharge end of the tooling 14. The continuity of the tooling surface 22 and its angle or slope depend on the configuration of the parts with which the bowl feeder 8 is used and how the tooling 14 is specially designed to orient the parts and feed the oriented parts to associated equipment.

The bowl 10 and track 12 are generally helically oscillated or vibrated at a helix angle slightly greater than the helix angle of the inside track 16. The bowl 10 is suitably mounted on and driven by a conventional vibrator unit or mechanism 30 for that purpose. The generally helical vibratory motion has a relatively large, primary helical component along the generally helical axis of the inside track 16 and a relatively small, secondary component (in a vertical direction or in a direction normal to the primary component depending on the vector diagram used as a frame of reference).

The angle of the generally helical vibratory motion is established to convey the parts upwardly along the inside track surface 20 from the bottom 13 of the bowl 10 to the entrance end of the tooling section 14 at the top of the bowl 10. Specifically, as the vibrating track surface 20 is driven in a forward or advancing direction, each part is carried forwardly a small step and is also propelled upwardly slightly. The vibration angle is established to make each part float on or above the inside track surface 20 as the vibrating track moves in the opposite or rearward direction and so that the inside track surface 20 is retracted below the parts during that rearward motion. The advancement and retraction cycle is repeated at a high frequency to advance the parts in small steps up the inside track surface 20.

The tooling section 14 has the same vibratory motion as the inside track section 16. Because the tooling surface 22 is downwardly sloping along most of its length (except at the entrance end of the transition section 11 connected to the inside track 16), the parts are fed more easily along the tooling surface 22 and normally at a higher rate. The tooling 14 may employ one or more auxiliary devices. In the disclosed embodiment, which is configured for feeding rubber O-rings, an auxiliary wheel 34 (driven by a motor 36 at a low RPM) is used to separate overlapping O-rings passing under the wheel 34. The separation is effected by the engagement of the peripheral surface of the wheel 34 with the overlying O-ring to displace it rearwardly from the underlying O-ring. Also, a curved finger 37 is provided over the external track surface 22 for performing the same function by holding the overlying O-ring or displacing it sideways while permitting the underlying O-ring to pass under the finger 36.

Excess parts and other parts which fall off the edge of the external track surface 22 fall into a return pan 40 having a smooth, generally flat and horizontal, part support surface 42. The return pan 40 is fixed to the bowl 10 and vibrates with the bowl 10. The vibration conveys the supported parts along the pan surface 42 and through an inlet opening 44 in the bowl 10 to the bottom 13 of the bowl 10.

In accordance with the present invention, the smooth part support surfaces 20, 22 and 42 are perforated along their full length. The support surfaces 20, 22 and 42 are preferably formed from perforated sheet metal stock (e.g., perforated sheet metal stock of stainless steel). The perforated stock is sufficiently thick (e.g., 0.090 inch thick) to provide stiff and rigid support surfaces for transmitting the vibratory movement from the bowl 10 to the supported parts without loss of energy.

The perforations in the smooth support surfaces 20, 22 and 42 reduce the area of contact between each part and the support surface 20, 22, 42. By reducing the area of contact, during the forward or advancement phase of the vibratory movement, each part is propelled upwardly with greater effect to ensure that each part is floating on or above the support surface during the retraction phase of the vibratory movement as the track moves in the opposite or rearward direction. This is so because the upward propulsion of each part is concentrated on a smaller area of the part. As a consequence, a part is less likely to remain on the track due to the absorption of some of the energy of the upward propulsion of the part. Also, because of the reduced contact area, a part is less likely to stick or adhere to the support surface, for example due to an oil or oil-like film between the part and support surface.

The perforations thereby help assure that each part is propelled upwardly sufficiently during the advancement phase for retracting the part support surface below the part during the retraction phase and such that the parts are conveyed along the support surfaces 20, 22, 42 at approximately the intended or optimum rate (e.g., to supply 40 to 80 parts per minute). Thus, the perforations in the inside track surface 20 help assure that the parts are conveyed helically upwardly along the inside track 16 at approximately the intended rate. Likewise, the perforations in the tooling surface 22 and pan surface 42 help assure that the parts are conveyed along those surfaces at approximately the intended rate.

A low and inadequate rate of advancement of a part can be caused by the part sticking to the support surface or by the described energy absorption property of the part. Rubber and other elastomeric parts are usually difficult to feed at the desired rate because of their absorption of some of the energy of upward propulsion of the part. The problem is exacerbated when there is a relatively high effective coefficient of friction between the part and the support surface as is usually the case with rubber and other elastomeric parts. For example, it has been found that rubber O-rings, small rubber stoppers and some other non-metal parts are not conveyed smoothly and at an appropriate rate along a solid track support surface because of the energy absorption property of the part and because of the relatively high effective coefficient of friction between the part and the support surface, but do feed smoothly and at approximately the intended rate when the support surface is perforated. The problem of inadequate part conveyance is also encountered when a part is coated with a light film of oil or other substance which causes the part to stick or adhere, even lightly, to the track surface. It has been found that a perforated track surface also reduces or eliminates the conveyance problems encountered with such problem parts.

The surface perforations must have a size substantially less than the size of the part with which the bowl feeder 8 is used so that the part is adequately supported by the part support surface. It is expected that perforations having a diameter of no greater than approximately ¼ inch will be acceptable in most applications. Also, it is expected that 3/16 inch and ⅛ inch diameter perforations will be acceptable in most applications. Subject to the dimensions of the part and any special requirements due to the configuration of the part, the perforations preferably cover at least approximately forty (40) percent of the total area (i.e., total area of the perforations and support surface) to reduce the area of contact between each part and the support surface by at least approximately forty (40) percent.

The perforations are preferably uniformly arranged along the full length of each support surface 20, 22, 42 and so that the part support is substantially uniform along the full length of the surface. For example, perforations having a diameter of ⅛ inch, 3/16 inch or ¼ inch are provided in parallel rows with a perforation spacing or pitch in each row, and between rows, equal to twice the diameter of the perforation and with alternate rows staggered by one-half the perforation pitch and such that the perforations cover approximately 40%, 51% and 58% respectively of the total area (i.e., total area of the perforations and support surface).

Figure 2:
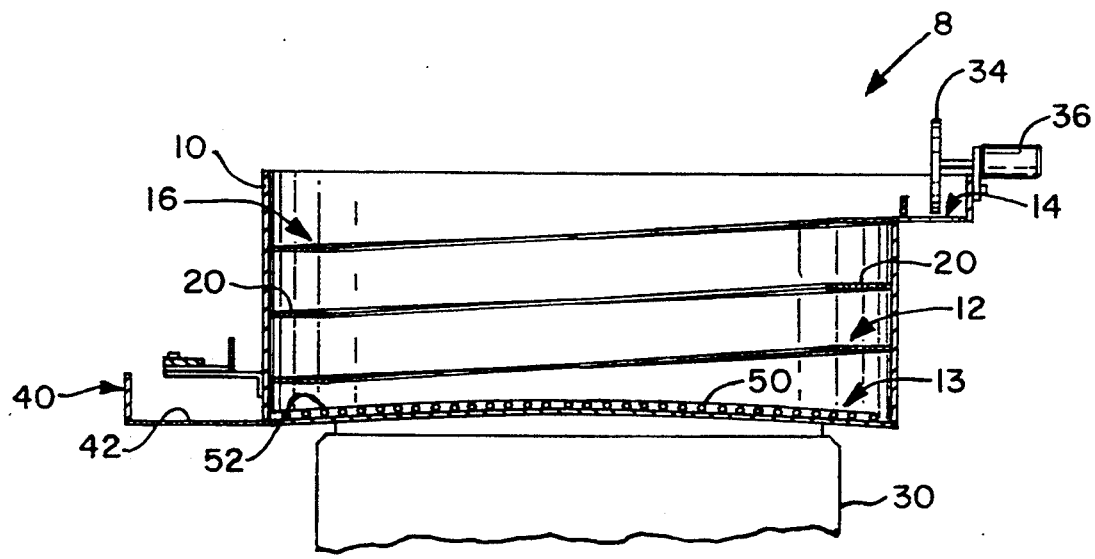
FIGS. 2-4 are enlarged elevation section views, partly broken away and partly in section, of the bowl feeder, taken generally along lines 2—2, 3—3 and 4—4 respectively of FIG. 1.
Figure 3:
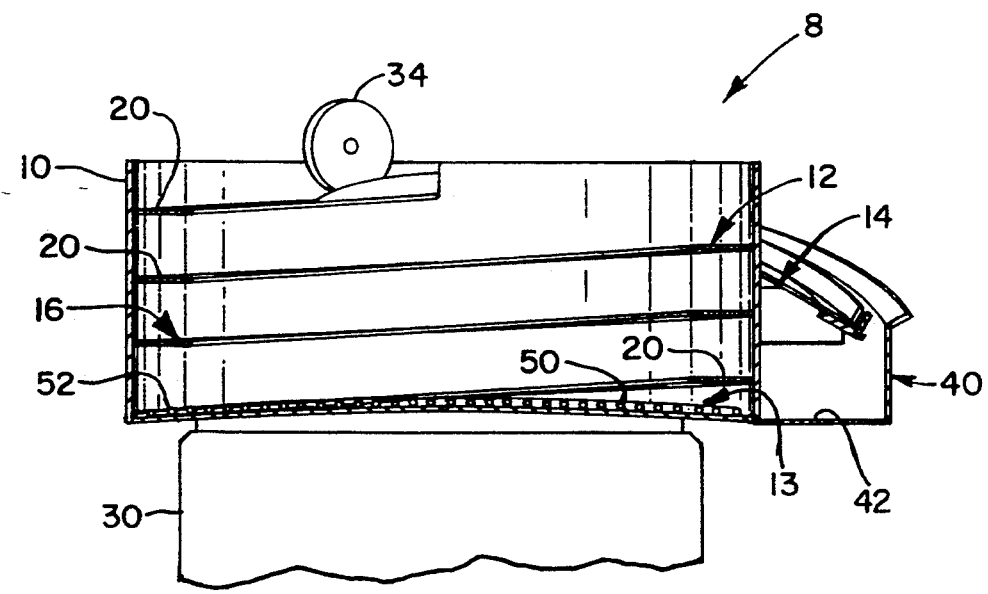
Figure 4:
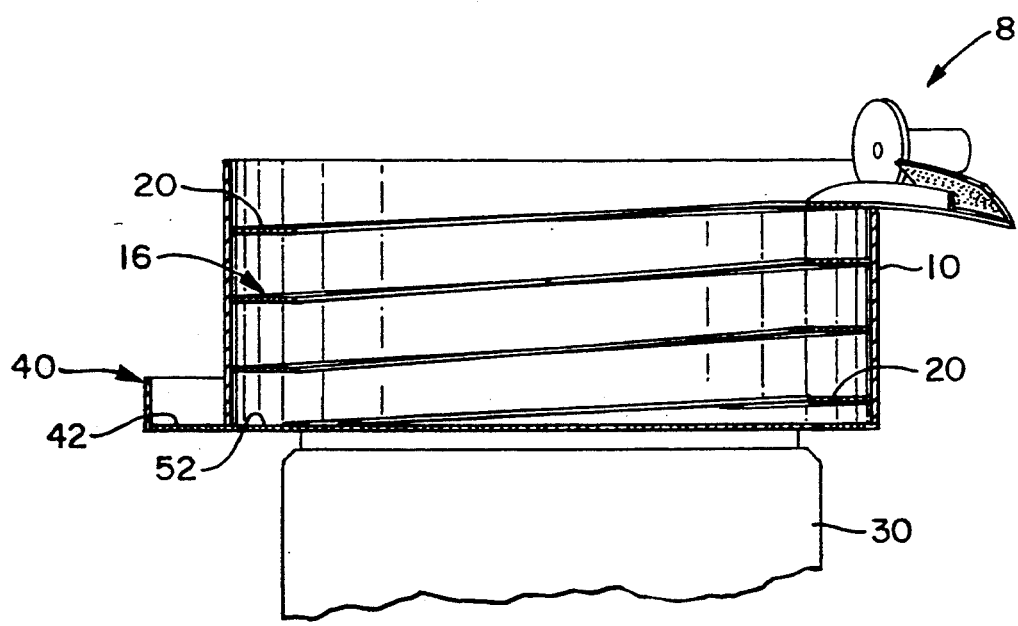

The bottom 13 of the bowl 10 is also designed to ensure adequate part conveyance to the lower end of the inside track surface 16. Since the parts are conveyed along the bottom 13 of the bowl 10 by vibratory movement of the bowl 10, the described part conveyance problems can occur on the bottom 13 of the bowl 10 as well as on the support surfaces 20, 22, 42. Accordingly, the bottom is either perforated (as described with respect to the support surfaces 20, 22, 42) as shown in FIG. 4, to eliminate or alleviate the problem, or, as shown in FIGS. 1–3, a raised spiral rib 50 is provided on the smooth bottom surface 52 of the bowl 10 to prevent face-to-face engagement of the part with the bottom surface 52. The raised rib 50 is provided by a small (e.g., ⅛ inch) diameter wire welded to the bottom surface 52. The convolutions of the spiral rib 50 are evenly spaced so that a part does not fit between adjacent convolutions and so that one side of the part is raised off the smooth bottom surface 52 of the bowl 10. The spiral rib 50 preferably extends from approximately the center of the bottom 52 of the bowl 10 outwardly to its outer edge to cover the entire bottom surface 52 of the bowl 10.

The described perforations provide surface breaks in the part support surfaces 20, 22, 42. In lieu of perforations in those support surfaces and/or in lieu of the spiral rib 50 or perforations in the bottom surface 52 of the bowl 10, it is expected that other forms of surface breaks could be provided. For example, it is expected that concave dimples or other surface recesses in the smooth support surfaces would provide for overcoming the part conveyance problems caused by the failure of the part to be propelled upwardly sufficiently during the advancement phase of the vibratory motion. However, a perforated surface is preferred over such alternatives because of the ready availability of appropriate perforated, sheet metal stock and because perforations do not have the disadvantage of accumulating foreign matter (e.g., like concave dimples would).

As will be apparent to persons skilled in the art, various modifications, adaptations and variations of the foregoing specific disclosure can be made without departing from the teachings of the present invention.

I claim:

1. In a vibratory feeder having a track and means for vibrating the track for conveying parts along the track, the track having a tooling section for feeding the parts in a predetermined manner to an associated device and a supply track section with a smooth part support surface with a lower end for receiving the parts and extending generally helically upwardly from its lower end to the tooling section, the vibrating means being operable to vibrate the track to convey parts up the generally helical track surface by generally helical vibratory movement with advancement and retraction phases at an angle which provides for propelling the parts upwardly from the generally helical track surface during the advancement phase of the vibratory movement and for retracting the support surface below the parts during the retraction phase of the vibratory movement; the improvement wherein the generally helical track surface has perforations generally uniformly arranged along the full length thereof from its lower end to the tooling section, the perforations having a size substantially less than the size of the parts and covering at least approximately 40% of the total area of the perforations and track surface to reduce the area of contact between the parts and track surface so that the parts are propelled upwardly from the track surface with greater effect during the advancement phase of the vibratory movement to enable the track surface to be retracted below the parts during the retraction phase of the vibratory movement.

2. A vibratory feeder according to claim 1 wherein the tooling section has a smooth part support surface for conveying parts therealong, the tooling support surface having perforations, generally uniformly arranged along the full length thereof, the perforations having a size substantially less than the size of the parts and covering at least approximately 40% of the total area of the perforations and tooling support surface to reduce the area of contact between the parts and tooling support surface so that the parts are propelled upwardly therefrom with greater effect during the advancement phase of the vibratory movement to enable the tooling support surface to be retracted below the parts during the retraction phase of the vibratory movement.

3. A vibratory feeder according to claim 1 wherein the perforations have a diameter no greater than approximately ¼ inch.

4. A vibratory feeder according to claim 1 wherein the supply track section is formed from perforated sheet metal stock.

5. In a bowl feeder having an upright bowl with a vertical axis and a bottom for holding parts, a generally helical track fixed to the bowl and extending generally helically upwardly on the inside of the bowl from the bottom of the bowl and then generally helically downwardly on the outside of the bowl, and means for vibrating the bowl and track for conveying parts along the bottom of the bowl to the track and then from the bottom of the bowl along the generally helical track, the generally helical track comprising a tooling section, largely on the outside of the bowl, for feeding the parts in a predetermined manner to an associated device and a supply track section on the inside of the bowl for conveying the parts from the bottom of the bowl to the tooling section, the inside track section having a smooth part support surface with a lower end for receiving parts from the bottom of the bowl and extending generally helically upwardly from its lower end to the tooling section, the vibrating means being operable to vibrate the inside track section to convey the parts up the inside track surface from its lower end to the tooling section by vibratory movement of the inside track section with advancement and retraction phases at an angle which provides for propelling the parts upwardly from the inside track surface during the advancement phase of the vibratory movement and for retracting the inside track surface below the parts during the retraction phase of the vibratory movement; the improvement wherein the inside track surface has perforations generally uniformly arranged along its full length, the perforations having a size substantially less than the size of the parts and covering at least approximately 40% of the total area of the perforations and inside track surface to reduce the area of contact between the parts and inside track surface so that the parts are propelled upwardly from the inside track surface with greater effect during the advancement phase of the vibratory movement to enable the inside track surface to e retracted below the parts during the retraction phase of the vibratory movement.

6. A bowl feeder according to claim 5 wherein the bottom of the bowl has a raised spiral rib extending outwardly from approximately the center of the bottom of the bowl with approximately evenly spaced convolutions.

7. A bowl feeder according to claim 5 further comprising a return pan on the exterior of the bowl for receiving parts falling of the tooling section on the outside of the bowl, the return pan being fixed to the bowl and having a smooth part support surface for conveying parts back to the bottom of the bowl, the pan surface having perforations therein generally uniformly arranged over its entire surface area, the perforations in the pan surface having a size substantially less than the size of the parts and covering at least approximately 40% of the total area of the perforations and pan surface to reduce the area of contact between the parts and pan surface so that the parts are propelled upwardly from the pan surface with greater effect during the advancement phase of the vibratory movement to enable the pan surface to be retracted below the parts during the retraction phase of the vibratory movement.

8. A method of facilitating the conveyance of parts along the track of a bowl feeder having an upright bowl with a vertical axis, a bottom for holding parts and a generally helical track fixed to the bowl and extending generally helically upwardly on the inside of the bowl from the bottom of the bowl and then generally helically downwardly on the outside of the bowl, and means for vibrating the bowl and track for conveying parts along the bottom of the bowl to the track and then along the generally helical track from the bottom of the bowl, the track comprising a tooling section, largely on the outside of the bowl, for feeding the parts in a predetermined manner to an associated device and a supply track section, with a smooth part support surface, on the inside of the bowl, the inside track surface having a lower end for receiving parts from the bottom of the bowl and extending generally helically upwardly from its lower end to the tooling section, the vibrating means being operable to vibrate the bowl and track to convey the parts up the inside track surface from its lower end to the tooling section by generally helical vibratory movement with advancement and retraction phases at an angle which provides for propelling the parts upwardly from the inside track surface during the advancement phase of the vibratory movement and for retracting the inside track surface below the parts during the retraction phase of the vibratory movement; the method comprising the step of providing perforations in the inside track surface generally uniformly arranged along its full length, the perforations having a size substantially less than the size of the parts and covering at least approximately 40% of the total area of the perforations and inside track surface to reduce the area of contact between the parts and inside track surface so that the parts are propelled from the inside track surface with greater effect during the advancement phase of the vibratory movement to enable the inside track surface to be retracted below the parts during the retraction phase of the vibratory movement.

9. In a vibratory feeder having a track and means for vibrating the track for conveying parts along the track, the track having a supply track section with a smooth part support surface with an entrance end for receiving the parts and an exit end, the vibrating means being operable to vibrate the supply track section to convey parts along the track surface from its entrance end to its exit end by vibratory movement of the supply track section with advancement and retraction phases at an angle which provides for propelling the parts upwardly from the track surface during the advancement phase of the vibratory movement and for retracting the track surface below the parts during the retraction phase of the vibratory movement; the improvement wherein the track surface has perforations generally uniformly arranged along the full length thereof from its entrance end to its exit end, the perforations having a size substantially less than the size of the parts and covering at least approximately 40% of the total area of the perforations and track surface to reduce the area of contact between the parts and track surface so that the parts are propelled upwardly from the track surface with greater effect during the advancement phase of the vibratory movement to enable the track surface to be retracted below the parts during the retraction phase of the vibratory movement.

10. A vibratory feeder according to claim 9 wherein the perforations have a diameter no greater than approximately $\frac{1}{8}$ inch.

11. A vibratory feeder according to claim 9 wherein the supply track section is formed from perforated sheet metal stock.

12. A vibratory feeder according to claim 9 wherein the vibratory feeder is a bowl feeder having a bowl with a bottom for holding the parts, wherein the track is fixed to the bowl, wherein the vibrating means is operable for vibrating the bowl and track, and wherein the supply track section extends generally helically upwardly on the inside of the bowl from the bottom of the bowl.

13. A vibratory feeder according to claim 12 wherein the bottom of the bowl has a smooth support surface with perforations therein generally uniformly arranged over its entire surface area, the perforations having a size substantially less than the size of the parts and covering at least approximately 40% of the total area of the perforations and bottom support surface to reduce the area of contact between the parts and the bottom surface so that the parts are propelled upwardly from the bottom surface with greater effect during the advancement phase of the vibratory movement to enable the bottom surface to be retracted below the parts during the retraction phase of the vibratory movement.

14. A method of facilitating conveyance of elastomeric parts along a track of a vibratory feeder having a smooth part support surface, and means for vibrating the track for conveying parts along the track surface by vibratory movement of the track with advancement and retraction phases at an angle which provides for propelling the parts upwardly from the track surface during the advancement phase of the vibratory movement and for retracting the track surface below the parts during the retraction phase of the vibratory movement, the method comprising the step of providing perforations in the surface area of the smooth part support surface generally uniformly along its full length, the perforations covering at least approximately 40% of the total area, including the perforations, to reduce the area of contact between the parts and support surface so that the parts are propelled upwardly from the support surface with greater effect during the advancement phase of the vibratory movement to enable the smooth support surface to be retracted below the parts during the retraction phase of the vibratory movement.

15. In a bowl feeder having an upright bowl with a vertical axis, a bottom for holding parts and a generally helical track fixed to the bowl and extending generally helically upwardly on the inside of the bowl from the bottom of the bowl and then generally helically downwardly on the outside of the bowl, and means for vibrating the bowl feeder for conveying parts along the bottom of the bowl to the track and then from the bottom of the bowl along the generally helical track, the track comprising a tooling section, largely on the outside of the bowl, for feeding the parts in a predetermined manner to an associated device and a supply track section, with a smooth part support surface, on the inside of the bowl, the inside track surface having a lower end for receiving parts from the bottom of the bowl and extending generally helically upwardly from its lower end to the tooling section, the vibrating means being operable to vibrate the bowl and track to convey the parts up the inside track surface from its lower end to the tooling section by generally helical vibratory movement with advancement and retraction phases at an angle which provides for propelling the parts upwardly from the inside track surface during the advancement phase of the vibratory movement and for retracting the inside track surface below the parts during the retraction phase of the vibratory movement; the improvement wherein the inside track surface has perforations generally uniformly arranged along its full length, the perforations having a size substantially less than the size of the parts and covering at least approximately 40% of the total area of the perforations and inside track surface to reduce the area of contact between the parts and inside track surface so that the parts are propelled upwardly from the inside track surface with greater effect during the advancement phase of the vibratory movement to enable the inside track surface to be retracted below the parts during the retraction phase of the vibratory movement.

16. A vibratory bowl feeder according to claim 15 wherein the tooling section has a smooth support surface for conveying parts therealong, the tooling surface having perforations, generally uniformly arranged along the full length thereof, the perforations having a size substantially less than the size of the parts and covering at least approximately 40% of the total area of the perforations and tooling surface to reduce the area of contact between the parts and tooling surface so that the parts are propelled upwardly therefrom with greater effect during the advancement phase of the vibratory movement to enable the tooling surface to be retracted below the parts during the retraction phase of the vibratory movement.

17. A vibratory bowl feeder according to claim 15 wherein the bowl feeder has a return pan with a smooth part support surface for receiving parts falling off the tooling section on the outside of the bowl and for conveying the parts back to the bottom of the bowl, the pan surface having perforations, generally uniformly arranged along the full length thereof, the perforations having a size substantially less than the size of the parts and covering at least approximately 40% of the total area of the perforations and pan surface to reduce the area of contact between the parts and pan surface so that the parts are propelled upwardly therefrom with greater effect during the advancement phase of the vibratory movement to enable the pan surface to be retracted below the parts during the retraction phase of the vibratory movement.

* * * * *

UNITED STATES PATENT AND TRADEMARK OFFICE
CERTIFICATE OF CORRECTION

PATENT NO. : 5,335,779
DATED : August 9, 1994
INVENTOR(S) : Steven E. Negrete

It is certified that error appears in the above-indentified patent and that said Letters Patent is hereby corrected as shown below:

Col. 7, Claim 5, line 38, change "e" to -- be --.

Col. 7, Claim 7, line 3, change "of" to -- off --.

Col. 8, Claim 10, line 3, change "½" to -- ¼ --.

Signed and Sealed this

Thirtieth Day of May, 1995

Attest:

BRUCE LEHMAN

Attesting Officer        Commissioner of Patents and Trademarks